United States Patent [19]

Scherer

[11] Patent Number: 4,660,542
[45] Date of Patent: Apr. 28, 1987

[54] COOKING SYSTEM WITH CLOSED LOOP HEAT TRANSFER MEANS

[75] Inventor: Richard M. Scherer, Niles, Mich.

[73] Assignee: South Bend Escan Corporation, South Bend, Ind.

[21] Appl. No.: 605,239

[22] Filed: Apr. 30, 1984

[51] Int. Cl.⁴ .............................................. A47J 27/06
[52] U.S. Cl. .................................... 126/378; 126/348; 126/92 B; 126/369; 99/403
[58] Field of Search .......... 126/378, 348, 369, 92 AC, 126/92 B, 92 R, 101; 431/328, 354; 99/293, 403; 165/104.21, 143, 172; 219/326, 439, 341, 399, 401; 220/428

[56] References Cited

U.S. PATENT DOCUMENTS

| | | | |
|---|---|---|---|
| 3,671,174 | 6/1972 | Reid, Jr. | 126/39 J X |
| 3,805,763 | 4/1974 | Cowan | 126/92 B X |
| 4,343,292 | 8/1982 | Kells et al. | 126/378 |
| 4,393,663 | 7/1983 | Grunes et al. | 62/511 X |
| 4,467,783 | 8/1984 | Hurley et al. | 126/378 |

Primary Examiner—Randall L. Green
Attorney, Agent, or Firm—Leydig, Voit & Mayer

[57] ABSTRACT

A cooking system particularly adaptable for commercial or institutional usage. The cooking system includes a high efficiency, gas fired heat generating sender, a cooking element or receiver, and a closed loop heat transfer circuit having a heating and vaporization zone within which a working fluid is heated and vaporized by the heat generating sender and a condensation zone disposed in adjacent relation to the cooking element within which the vapor is circulated and condensed for transferring heat to the cooking element and food contained therein. The sender may be remotely located from the cooking element and may be utilized for selectively applying heat to a plurality of such cooking elements. Several alternative embodiments of cooking elements are disclosed.

34 Claims, 10 Drawing Figures

COOKING SYSTEM WITH CLOSED LOOP HEAT TRANSFER MEANS

DESCRIPTION OF THE INVENTION

The present invention relates generally to cooking equipment, and more particularly, to cooking equipment intended for commercial or institutional usage.

Most commercial cooking equipment today is highly specialized, being characterized by integrally designed burners specifically adapted for the particular unit. Because of the variety of such specialized forms of cooking equipment, it has not been possible to effectively optimize the manufacture of such equipment. Moreover, the design of present commercial cooking equipment has focused primarily on speed and capacity of cooking, with little regard for energy utilization efficiencies.

In addition to direct energy consumption, which can be significant in commercial cooking, other indirect energy considerations also can have an important economic impact. For example, in restaurants, fast food eating establishments, institutions and the like, deep fat fryers, grills, and other cooking equipment generate significant heating effects in the kitchen, create cooking odors, and if gas fired, draw combustion air from the kitchen and generate combustion gases. In such establishments, it is common practice to employ large exhaust hoods well above the cooking device for maintaining the kitchen in properly ventilated condition for workers therein and to prevent cooking odors from entering the dining area. Such exhaust hoods must draw large quantities of air from the kitchen to be effective, which in turn draws air from the surrounding rooms, greatly increasing the air conditioning or heating loads in such rooms. Because of the high cost of energy today, improvements in either direct or indirect energy utilization can significantly offset the cost of the equipment.

Accordingly, it is an object of the present invention to provide an improved cooking system adapted for low cost manufacture and more efficient operation.

Another object is to provide a cooking system as characterized above which can be operated with relatively high energy utilization efficiencies and reduced exhaust and ventilating requirements in the kitchen.

A further object is to provide a cooking system of the above kind in which the heat generating means is separable from the cooking element, and thus, lends itself to a standardized design and economical manufacture. A related object is to provide such a cooking system in which a single heat generating means may be used for a plurality of different cooking elements.

Still another object is to provide a gas fired cooking system of the foregoing type which is adapted to permit more efficient utilization of kitchen space and can be operated without drawing combustion air or emitting combustion gases in the kitchen and without significantly increasing the temperature of the kitchen.

Another object is to provide such a cooking system which has a recirculating heat transfer fluid that more efficiently permits energy not utilized during cooking to be retained in the system.

Yet a further object is to provide a cooking system of the foregoing type that has a wide temperature range of operation and is easy to control and monitor.

Still another object is to provide such a cooking system which lends itself to easy repair, most of which can be effected outside the kitchen.

Other objects and advantages of the invention will become apparent upon reading the following detailed description and upon reference of the drawings, in which:

While the invention is susceptible of various modifications and alternative constructions, certain preferred embodiments have been shown in the drawings and will be described below in detail. It should be understood, however, that there is no intention to limit the invention to the specific forms described but, on the contrary, the intention is to cover all modifications, alternative constructions and equivalents falling within the scope of the invention.

Figure 1:
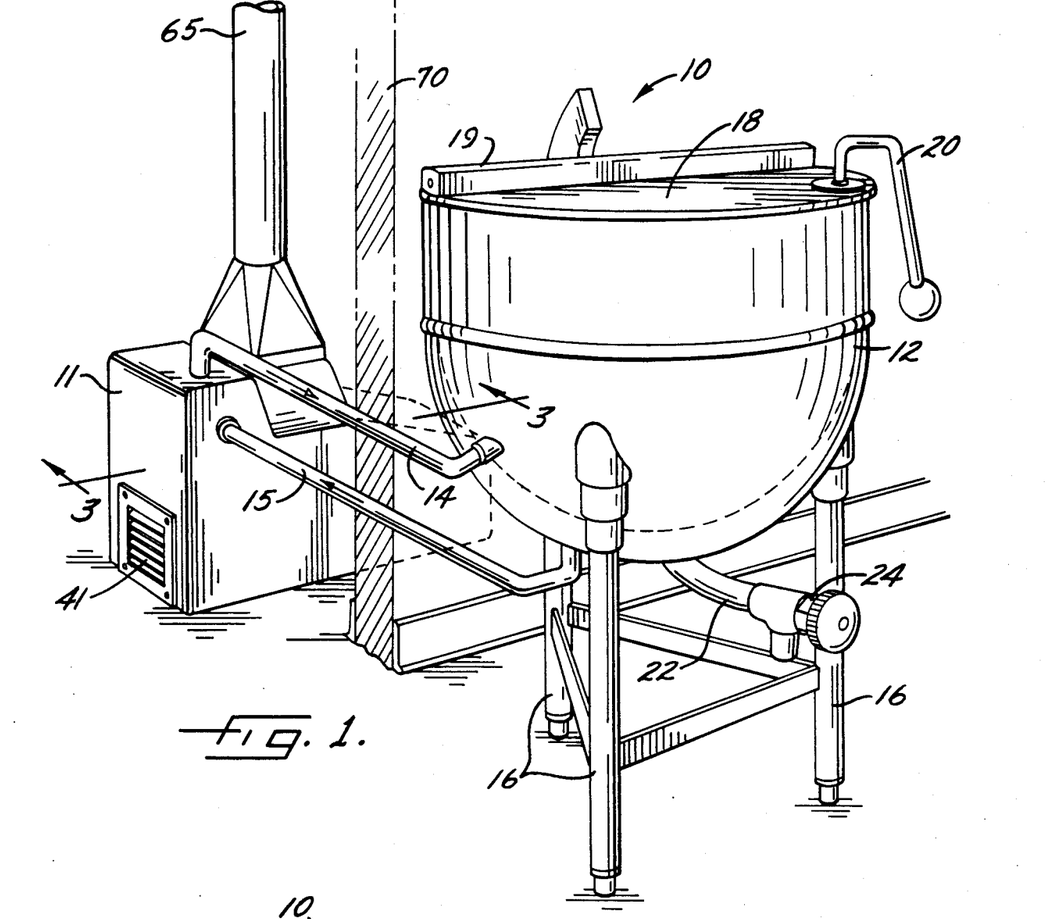
FIG. 1 is a perspective of an illustrative cooking system embodying the present invention.
Figure 2:
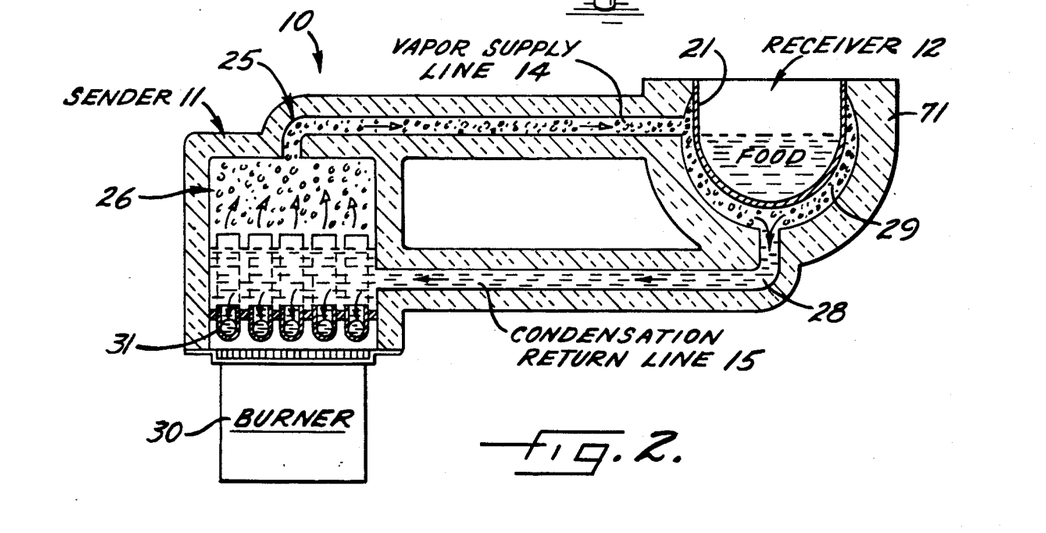
FIG. 2 is a diagrammatic illustration of the cooking system shown in FIG. 1.

Referring now more particularly to FIGS. 1 and 2 of the drawings, there is shown an illustrative cooking system 10 embodying the present invention. The cooking system 10 includes a heat generator or sender 11, a food cooking element or receiver 12, and coupling means in the form of delivery and return conduits 14, 15, respectively, connecting the receiver 12 to the sender 11. The cooking element or receiver 12 in this instance is in the form of a kettle supported in upstanding relation by a plurality of support legs 16 and having an upper lid 18 pivotably mounted on a hinge 19. The lid 18 may be lifted by means of a handle 20 to permit access to a food receiving container or pot 21 of the kettle, which typically is sized for cooking commercial quantities of food and preferably made of a polished, stainless steel to facilitate sanitary cleaning. To permit easy removal of liquids from the kettle following cooking, a discharge line 22 extends forwardly from the underside of the kettle and a manually operated valve 24 is mounted at the end of the line 22.

In accordance with the invention, the cooking system has a hermetically sealed, closed-loop heat transfer circuit within which a working fluid is recirculated between the sender and cooking element for energy efficient cooking. As diagrammatically illustrated in FIG. 2, the cooking system 10 has a closed loop heat transfer circuit 25 which includes a heating and vaporization zone 26 located in the sender wherein a working fluid 28 is heated and vaporized, the conduit 14 which serves as a vapor supply line communicating between the heating and vaporization zone 26 and a cooking zone or chamber 29 surrounding the outside of the container 21 within which circulating vapor condenses during cooking to release and transfer heat of condensation to container 21 and the food therein, and the conduit 15 which serves as a condensate return line between the cooking chamber 29 and the heating and vaporization zone 26 and through which condensate is returned for reheating and vaporization.

In keeping with the invention, the heat generator or sender 11 operates as a high efficiency gas fired boiler and comprises a radiant burner 30 and a plurality of working fluid transfer tubes 31 that form a part of the heating and vaporization zone 26 of the closed loop heat transfer circuit 25. As shown in more detail in FIGS. 3-6, the sender has a housing 35 preferably molded of an insulating material and a lower frame 36 that supports the housing 35 and the radiant burner 30. The burner 30 in this case is in the form of a flat, porous-tile slab, such as that commercially available from Swanke GMH, Bremerhavener Strabe 43, Postfach 620 249, D-500 Koln 60, West Germany, which permits the uniform passage of gaseous fuel introduced from the underside thereof through the tile for burning with a small flame, on the order of a few thousandths of an inch, on the top side thereof and with a relatively high temperature gradient between the top and bottom sides. The burner 30 in this instance has a rectangular shape extending substantially the length of the sender 11 and is supported by the frame 36 so as to define air passageways 38 about the opposed, long sides thereof (FIGS. 4 and 5).

Figure 3:
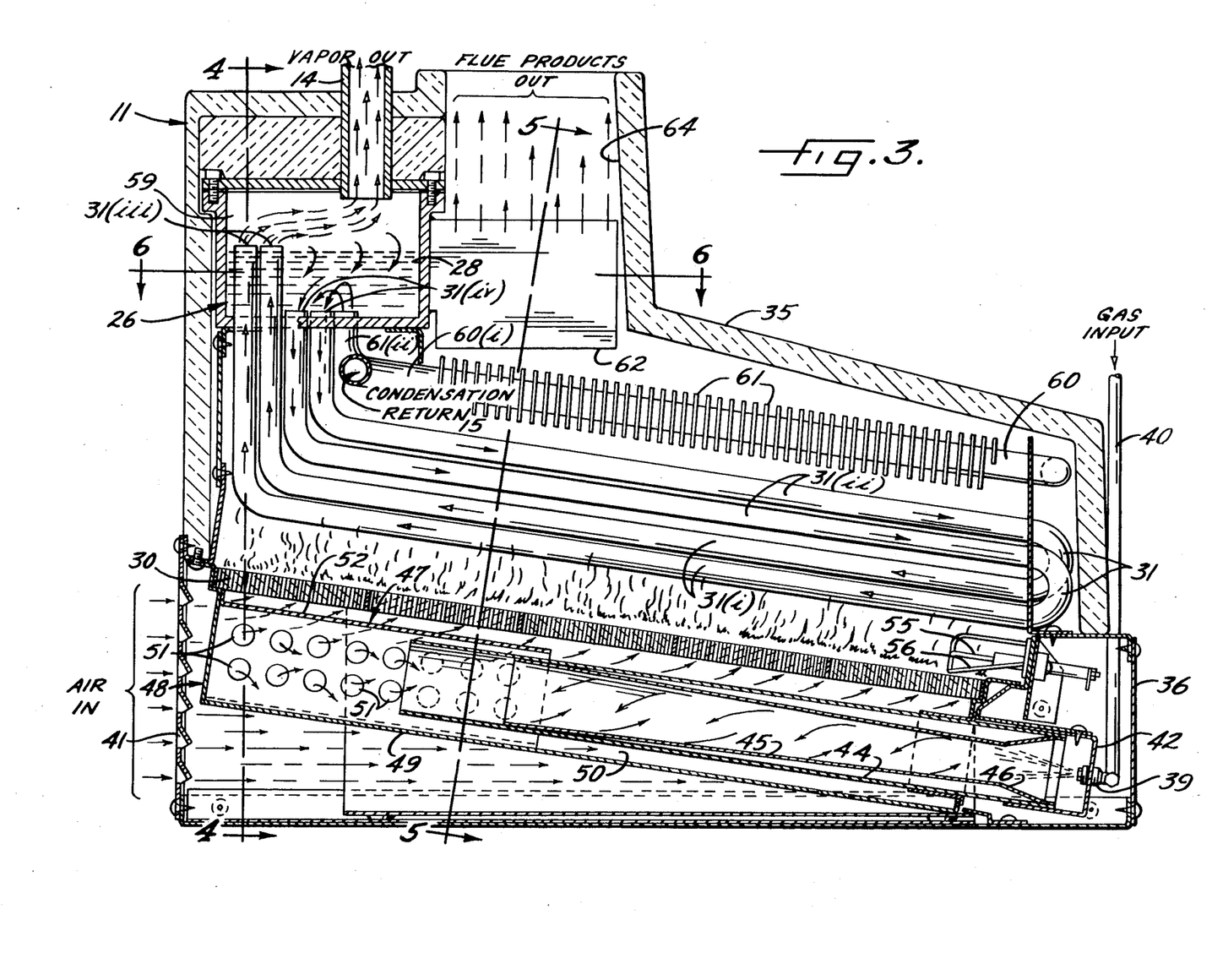
FIG. 3 is an enlarged vertical section of the heat generating means or sender of the illustrated system, taken in the plane of line 3—3 in FIG. 1.

For supplying an air/fuel mixture to the underside of the burner 30, a gas discharge nozzle 39 supplied from a gas line 40 is disposed below the burner 30 at one end and the frame 36 is formed with an air inlet 41 at the opposite end of the burner. The discharge nozzle 39 is supported by an end plate 42 of a gas directing tube 44, within which is concentrically mounted a venturi tube 45. The venturi tube 45 has an inlet adjacent the nozzle 39, a reduced diameter venturi throat 46 a relatively short distance from the inlet and a discharge end which extends in outwardly tapered fashion into adjacent relation with the gas directing tube 44, which forms an extension of the venturi tube 45. The discharge end of the gas directing tube 44 in this case is located approximately three quarters of the length of the burner 30 from the discharge nozzle 39.

The gas directing tube 44 in turn is disposed within a mixing plenum 48 which encloses the underside of the burner. The mixing plenum is defined by a lower panel 49 supported below the gas directing tube 44 and extending substantially the length of the burner 30, side panels 50 and an end panel 47 adjacent the air inlet 41. For facilitating the proper distribution of gas exiting the gas directing tube 44, the discharge end of the gas directing tube 44 is disposed within the open end of a distributing plenum 47 comprising a top panel 52 located between the discharge end of the gas directing tube 44 and the burner 30 and side panels 53 connected between the opposed ends of the panel 52 and the bottom panel 49 of the plenum 48. The side panels 53 of the distributing plenum 47 are formed with a series of apertures 51 adjacent the discharge end of the gas directing tube 44. The radiant burner 30, nozzle 39, gas directing tube 44, mixing plenum 48, and distributing plenum 47, all are supported at a common relatively small angle to the horizontal, preferably about 10 degrees, with the air inlet being under the elevated end.

Figures 4, 5:
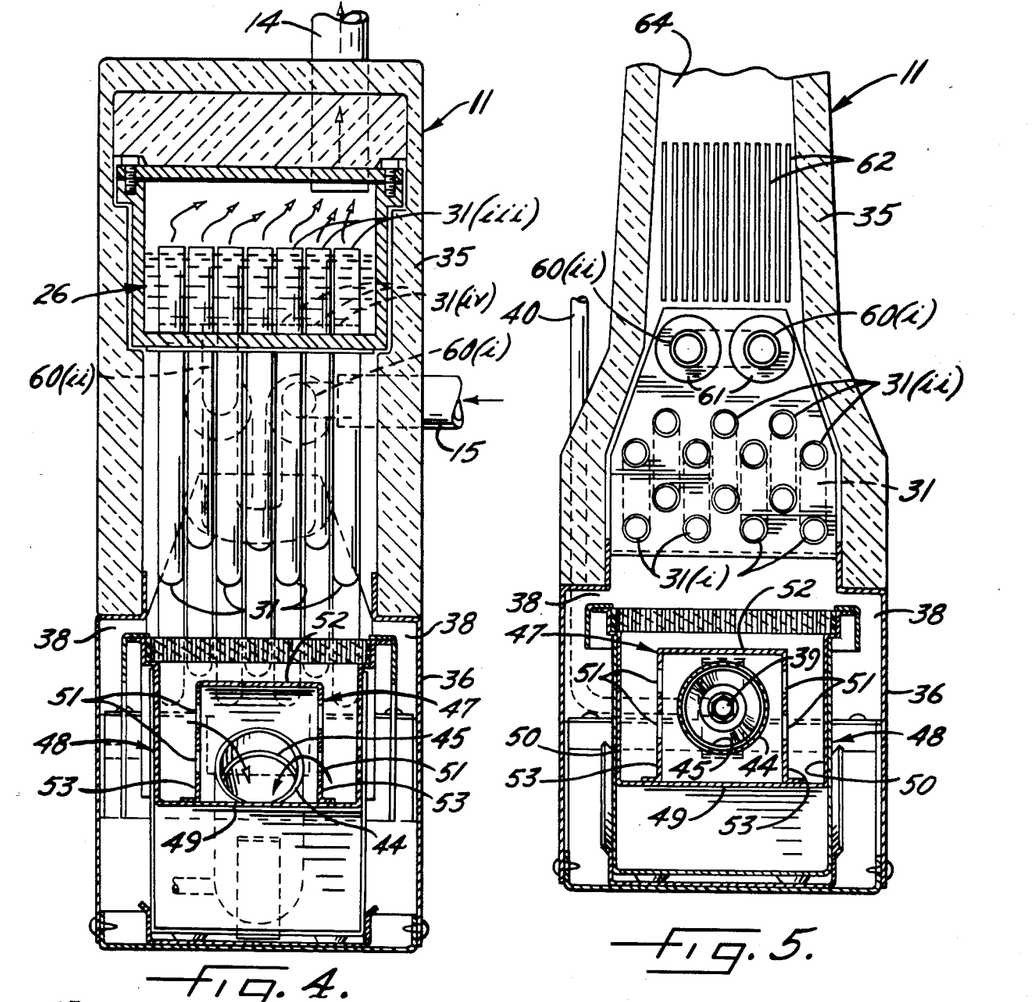
FIGS. 4–6 are sections taken in the planes of lines 4—4, 5—5 and 6—6, respectively, in FIG. 3.
Figure 6:
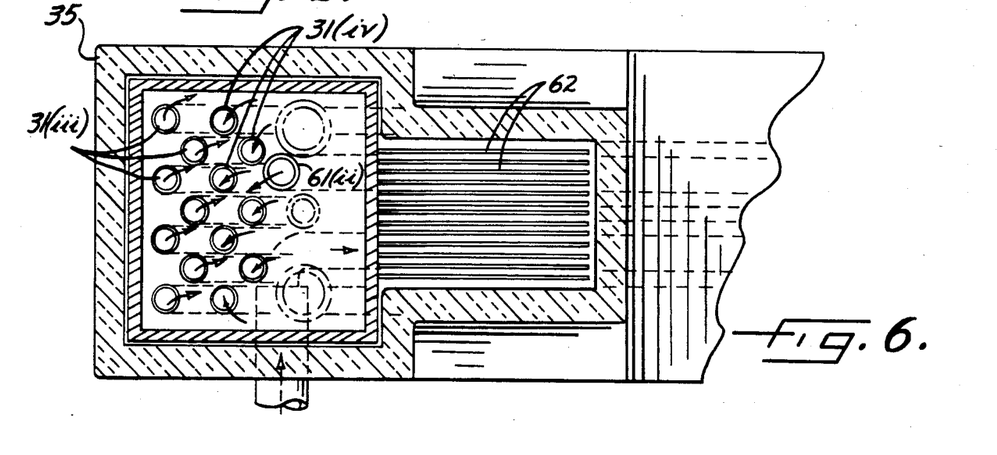

In operation of the burner 30, as best illustrated in FIGS. 3 and 4, gaseous fuel, such as natural or LP gas, is directed into the venturi tube 45 from the discharge nozzle 39. The venturi tube 45 develops a high velocity gas flow through and out the end of the gas directing tube 44, which together with the thermal draw from the burner 30, creates and air flow through the air inlet 41 of the sender 11. Gas exiting the distributing plenum apertures 51 will mix with the incoming air, flow around the plenum 47, and be distributed uniformly along the underside of the burner 30. The gas then flows in a uniformly controlled manner through the porous-tile burner 30 and burns completely with a minute flame on the top side thereof. At the same time, a portion of the air drawn into the sender passes about the outside of the plenum 48 and through the passageways 38 on opposed sides of the burner 30, thereby preventing the downward flow of heat from the burner, as well as preventing excessive heating of the sides of the sender frame 36 and housing 35. Preferably, approximately twice the quantity of air necessary for combustion is drawn into the sender with about one-half of the air entering the mixing plenum 48 and the other half passing about the underside thereof and through the air passageways 38.

For igniting the burner 30 on startup and for monitoring burning, a spark igniter 55 and a flame detector 56 of a known type are provided (FIG. 3). The igniter 55 and detector 56 preferably have appropriate electronic controls such that upon startup, a spark is generated in the igniter 55 for initiating a flame on the burner 30, at which time the igniter is deactivated. In the event the detector 56 should detect the absence of a flame on the burner, the igniter 55 will again be activated to restart the flame. If ignition does not occur within a predetermined time period, on the order of several seconds, the control may be designed to shut off the gas supply so as to prevent the harmful accumulation of gas in the sender.

In a typical operation of the burner 30, if propane gas is introduced into the sender at a rate of 0.227 cfm (about 1/7 lb per hour), air is drawn into the sender at a rate of about 10.4 cfm (about 46 lb. per hour) with approximately one-half of the air mixing with the gas in the mixing plenum 48 and passing through the burner and the other half of the air passing about the sides of the burner. In such case, the burner generates on the order of 34,000 BTU per hour, creating a temperature gradient of approximately 1500° F. across the burner, with the upper surface thereof having a temperature of about 1700° F., while the underside surface thereof is only at a temperature of about 200° F. Such operation of the burner 30 will effectively and efficiently heat the working fluid 28 in the transfer tubes 31 immediately above the burner causing the fluid to vaporize and circulate through the closed loop circuit 25. Air drawn into the sender from the inlet 41 not only provides the combustion air for the fuel, but facilitates mixing and distribution of the gaseous fuel and picks up heat which would otherwise be lost from the burner and directs it through the sender. The simultaneous air flow about the sides of the burner also prevents excessive heating of the sender housing and frame which permits a more compact sender design, and thus, its economical manufacture and compact installation.

To facilitate heating and vaporization of the working fluid 28 in the heating and vaporization zone 26, the transfer tubes 31 each are generally U-shaped having lower and upper legs 31(i), 31(ii) respectively, disposed in parallel relation to the burner 30. The legs 31(i), 31(ii)

are connected together at one end by a U-turn and have their opposite open ends coupled to a vaporization chamber 59, which typically during operation of the burner 30 is about half filled with a liquid phase of the working fluid 28. An upper most end 31(iii) of the lower leg 31(i) of each transfer tube 31 preferably extends into the vaporization chamber 59 to a point above the level of the liquid phase working fluid, while the end 31(iv) of the upper leg 31(ii) of each transfer tube 31 is below the level of the liquid working fluid. Since the lower leg 31(i) of each transfer tube 31 is in closer relation to the burner 30 and is subject to greater radiant energy than the upper leg 31(ii) a directional flow is imparted to the working fluid in the transfer tubes 31, as shown by the arrows in FIG. 3, with vapor generated during such heating being emitted out the open ends 31(ii) of the lower legs 31(i) while liquid phase working fluid enters the transfer tubes through the open ends 31(iv) of the upper legs 31(ii). The vapor generated during such heating exits the chamber 59 into the vapor supply line 14, coupled to the top of the chamber 59, as best shown in FIGS. 3 and 4, and flows to the cooking chamber 29 of the closed loop circuit, which in this instance surrounds the outer perimeter of the food receiving container 21 of the kettle 12. The hot vapor entering the cooking chamber 29 will cause heat transfer to the food in the container 21, which in turn will cause condensation of the vapor, releasing additional heat of condensation for utilization in the cooking operation.

The working fluid that condenses in the cooking chamber 29 drains to the bottom of the chamber and into the condensation return line 15 (FIG. 2), which in turn communicates with one leg 60(i) of a U-shaped condensate return tube 60, the other leg of which connects with the bottom of the vaporization chamber 59. The U-shaped return tube 60 is formed with a plurality of heat receiving fins 61 and is disposed immediately above the transfer tubes 31 so as to be exposed to the hot flue products rising from the burner 30, thereby preheating of the condensate prior to return to the vaporization chamber 59. To further enhance heating of the working fluid in the vaporization chamber 59, the chamber 59 has a plurality of heat absorbing fins 62 mounted in outwardly extended fashion immediately above the condensate return tube 60. In the illustrated embodiment, following passage of the flue products through the vaporization chamber fins 62, they are directed out an exhaust passageway 64 in the housing 35, which in turn is coupled to a flue 65 (FIG. 1) that exits to the outside atmosphere.

In keeping with the invention, the working fluid can be selected for the desired cooking temperature range. For cooking temperatures up to about 260° F., the working fluid 28 may conveniently be water. Although water may be used as a working fluid for higher temperature cooking, the closed loop circuit 25 would have to be appropriately designed to withstand the higher operating pressures. Hence, for cooking at temperatures in excess of about 260° F., working fluids with higher boiling points are preferred. For example, various aliphatic or paraffinic oils, mineral salts, and metals have relatively high boiling points which could be used for cooking at temperatures up to as much as 600° F. without the generation of pressures which would require special strength design considerations in the closed loop heat transfer circuit 25. Although the working fluid 28 is sealed in the closed loop circuit 25, it preferably should be nontoxic in order to guard against danger from accidental leakage. Prior to introducing the working fluid 28 into the closed loop circuit 35 during initial charging of the system, the closed loop circuit 25 preferably should be evacuated so as to eliminate possible contaminates.

Since the closed loop circuit 25 is maintained in a sealed condition after charging with the working fluid 28, the working fluid may be utilized for prolonged periods without accumulation of contaminates, mineral build up, or the necessity for regular replenishment. It also will be appreciated by one skilled in the art that the closed loop heat transfer circuit 25 may be operated with lesser energy losses than conventional cooking equipment, and thus higher energy utilization efficiencies. In addition to the efficiencies achieved from the relatively direct transfer of energy from the burner 30 to the working fluid 28 in the vaporization zone 26 of the sender 11, energy in the form of hot condensate in the cooking chamber, which is not utilized during the cooking operation and typically lost in conventional cooking systems, is returned to the sender and retained in the closed loop heat transfer circuit. Moreover, since the working fluid 28 in the closed loop circuit 25 will have precise vapor vs. temperature characteristics, the cooking operation can be controlled and monitored with relative precision. The liquid levels of the working fluid in the closed loop circuit also can be predictably designed to achieve the desired heat transfer characteristics.

In accordance with another aspect of the invention, the sender 11 is separable from the cooking element or receiver 12 so that it may be located outside the kitchen and remote from the cooking element for reducing the heat gain in the kitchen normally attributable to commercial cooking equipment and for minimizing ventilation requirements. As shown in FIG. 1, in the illustrated cooking system 10, the kettle 12 is located in a kitchen area on one side of a wall 70 and the sender 11 is located outside the kitchen immediately adjacent the opposite side of the wall. With the cooking element 12 separated from the heat sender 11 in such manner, the cooking element may have a more simplified design with relatively heavy insulation 71 (FIG. 2) for enhancing cooking efficiency and further minimizing kitchen heat gain. With the sender 11 remotely located in such a manner, combustion air also is not taken from kitchen, nor is there a necessity for flue risers in the kitchen or large overhead hoods, thereby substantially reducing the removal of air from the kitchen and the drain on heating or air conditioning requirements in adjacent rooms. Where it remains desirable to remove cooking odors, this generally can be done by vents located in close proximity to the cooking surface which require much lower air flows than overhead hoods, as will become apparent. The remote location of the sender 11 also enables most services to be done without entering the kitchen and further permits more compact kitchen arrangements. Since the sender 11 and cooking element 12 are adjacent a common wall 70, however, the coupling conduits 14, 15 are relatively short, and hence, the heat losses therefrom are minimized.

Figures 7, 8, 9, 10:
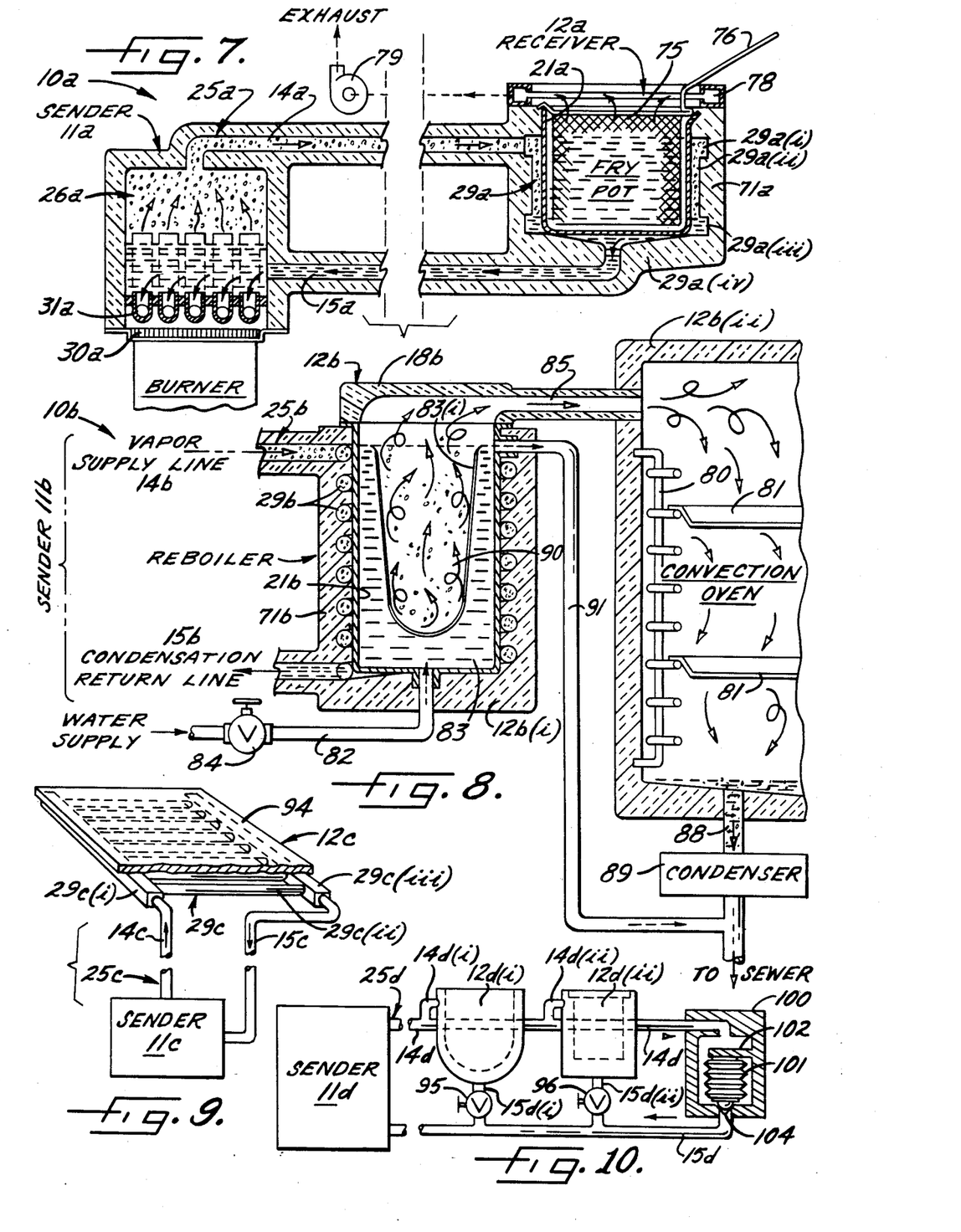
FIG. 7 is a partially diagrammatic illustration of an alternative form of cooking system embodying the present invention.
FIG. 8 is a partially diagrammatic, vertical section of another embodiment of cooking system.
FIG. 9 is a diagrammatic illustration of still another alternative embodiment of the cooking system according to the present invention.
FIG. 10 is a diagrammatic illustration of yet another alternative embodiment of cooking system.

In keeping with the invention, the sender is applicable, without major modification, to a wide variety of commercial cooking processes so as to permit a standardized design and more efficient manufacture. For example, FIG. 7 shows an alternative embodiment of the cooking system 10a according to the present invention wherein items similar to those described above have been given similar reference numerals with the distinguishing suffix "a" added. The cooking system 10a has a sender 11a identical to that described above coupled by means of a vapor supply line 14a and a condensation return line 15a to a receiver 12a, in this case in the form of a deep fat fryer. The deep fat fryer 12a includes a container 21a for holding a quantity of cooking oil and a food holding basket 75 having a handle 76 for manually positioning the basket into the container 21a.

For heating the cooking oil in the container to the appropriate cooking temperature, the vapor supply line 14a in this instance communicates with a cooking element conduit 29a that includes an upper ring or manifold 29a(i) disposed in close relation about the perimeter of an upper portion of the container 21a. The manifold 29a(i) communicates through a plurality of vertically disposed conduits 29a(ii) with a bottom manifold or ring 29a(iii), also disposed in close relation about the outer perimeter of the container 21a. The bottom manifold 29a(ii) communicates with a chamber 29a(iv) encompassing the bottom of the container 21a, and the chamber 29a(iv) in turn connects to the condensate return line 15a. Working fluid vaporized in the heating and vaporization zone 26a of the sender 11a is directed through the vapor supply line 14a, circulates through the manifold 29a(i) conduits 29a(ii), manifold 29a(iii), and bottom chamber 29a(iv) for transferring heat to the container 21a and the cooking oil therein, with condensate from the vapor draining into the condensate return line 15a for return to the sender 11a for reheating and vaporization. For reducing heat gain in the kitchen, the container 21a, conduit 29a, and chamber 29a(i) are contained within heavy insulation 71a.

Because the oil fumes from deep fat fryers frequently have bad odors, are dirty, and create an unhealthy environment, conventional deep fat fryers typically require large overhead exhaust hoods to effect removal of such cooking fumes and excessive heat, as well as removal of combustion gases, if gas burners are employed. In the cooking system 10a, by locating the sender 11a outside the kitchen as previously described, and by virtue of the heavy insulation 71a about the container 21a, kitchen heat gain during cooking is substantially reduced, which in turn reduces ventilating requirements. Hence, proximity ventilating means, such as an exhaust ring 78, can be concentrically mounted about the upper perimeter of the container 21a. The exhaust ring 78 in this instance is coupled to an appropriate exhaust fan 79 which is operable to cause cooking fumes from the top of the container to be drawn outwardly into the exhaust ring 78 and then be directed to the outside environment. Such proximity venting effectively disposes of cooking fumes, while removing only a relatively small amount of air from the kitchen as compared to overhead exhaust hoods, and thus, further enhances the overall efficiency of the cooking operation.

Referring now to FIG. 8 of the drawings, there is shown another alternative embodiment of the invention wherein items similar to those described above have been given similar reference numerals with the distinguishing suffix "b" added. The cooking system 10b has a sender 11b and a receiver 12b in the form of a convection steamer, which includes a boiler 12b(i) and an oven chamber 12b(ii) having a rack 80 upon which a plurality of food containing trays 81 may be supported in a conventional manner.

For supplying steam to the oven chamber 12b(ii), the boiler 12b(i) has a container 21b that is provided with a continuous supply of water 83 from a line 82 coupled to the container 21b at a bottom central location and controlled by a valve 84. The boiler 12b(i) has a cover 18b with a steam line 85 extending therefrom and communicating with the upper end of the oven chamber 12b(ii) In order to heat the boiler 12b(i) for boiling water therein to generate steam, the vapor supply line 14b from the sender 11b communicates with an upper most ring of a helical conduit 29b disposed in close relation about the container 21b, with a lower most ring of the conduit 29b being coupled to the condensation return line 15b. The boiler 12b(i) has a relatively heavy insulation 71b surrounding the conduit 29b and container 21b, again for minimizing heat losses in the boiler and undesirable heat gain in the kitchen.

By directing hot vapor through the vapor supply line 14b and conduit 29b heat is transferred to the water 83 in the container 21b, causing turbulent boiling thereof and the resultant generation of steam which flows through the steam conduit 85 and into the oven chamber 12b(i), which may be at atmospheric pressure. Condensate resulting from the condensation of vapor in the helical conduit 29b following heat transfer to the water in the boiler 12b(i) again will drain into the condensate return line 15b for return to the sender 11b for reheating and vaporization. As the steam directed into the oven chamber 12b(ii) passes over the cooking trays and transfers heat to the food therein, such steam similarly will condense, at least in part, releasing heat of condensation for utilization in the cooking operation, and then will flow into a drain 88 in the bottom of the oven chamber 12b(ii), which is coupled to a condenser 89 for condensing any remaining steam prior to discharge to the sewer.

In keeping with a further aspect of the invention, means are provided in the cooking system 10b for minimizing undesirable mineral buildup in the boiler 12b(i). To this end, it has been found that as boiling action of the water 83 occurs in the boiler 12b(i), water rises up the sides of the boiler container 21b in a progressively thinner film 83(i) as steam generates in a resulting central core area 90. It also has been found that the mineral concentration in the water film 83(i) becomes progressively greater as the film rises. For to minimizing the undesirable buildup of minerals in the boiler 12b(i), a discharge line 91 is coupled to the boiler 12b(i) near the top thereof for removing of the thin film of water from the boiler 12b(i) after it has a relatively high mineral concentration. Hence, the line 91 continually discharges such high mineral containing water to the sewer, as shown in FIG. 8. prior to the minerals causing a building up problem in the boiler.

Referring now to FIG. 9, there is shown still another cooking system 10c embodying the present invention wherein items similar to those described above are given similar reference numerals with the distinguishing suffix "c" added. The cooking system 10c includes a sender 11c and a cooking element or receiver 12c in the form of a uniform temperature grill having relatively thin metal plate 94 upon which food to be grilled is placed. For heating the grill plate 94, a vapor supply line 14c from the sender 11c communicates with a cooking element conduit 29c comprising an inlet manifold 29c(i), a plurality of longitudinal conduits 29c(ii) and an exit manifold 29c(iii) disposed in a flat array immediately adjacent the underside of the grill plate 94, with the discharge manifold of the conduit 29c(iii) being connected to the condensation return line 15c.

By virtue of such configuration, the grill 12c is adapted for more uniform temperature cooking than conventional grills which typically comprise a metal plate and a gas flame burner for heating from the underside. With such conventional grills, the temperature of the cooking surface can greatly vary depending upon the amount of food that is placed upon the grill for cooking. As a result, the time necessary for cooking changes and this can greatly effect the consistency and quality of the cooked food, particularly in fast food eating establishments and the like where cooking frequently is done by relatively inexperienced help and in such large quantities that attention can not be given to the individual serving.

In the cooking system 10c, hot vapor is circulated from the sender 11c through the conduit 29c. If only a small amount of food, such as a few hamburgers, are placed on the grill plate 94, a relatively small amount of condensation of the vapor will occur at such point in the conduit 29c, which immediately releases heat of condensation for maintaining the desired cooking temperature. Likewise, if a large amount of food is placed on the grill, proportionally greater condensation of the vapor will occur within the cooking element conduit 29c, which again maintains the grill at a substantially uniform cooking temperature. Moreover, it will be appreciated that not only is the desired cooking temperature maintained, but the response to changes in cooking loads is substantially instantaneous. Because the grill can be maintained at a substantially constant temperature, large quantities of food may be cooked uniformly and consistently substantially on a timed basis by relatively inexperienced help. The grill 12c similarly has the other advantages of the present invention previously described, including improved energy utilization efficiencies, susceptibility to separation of sender and cooking element, minimized ventilation requirements, and simplification of cooking element design.

Referring now to FIG. 10, there is shown a further cooking system 10(d) embodying the invention wherein items similar to those described above have been given similar reference numerals with the distinguishing suffix "d" added. The cooking system 10d includes a sender 11d which is operable for srmultaneously or individually energizing any of a plurality of cooking elements while maintaining the advantages of a sealed, closed loop heat transfer system. The cooking system 10d in this case is adapted to simultaneously or selectively heat a kettle 12(d)(i) and a deep fat fryer 12b(ii), both being similar to those previously described. To this end, each cooking element has a respective vapor supply line 14d(i), 14d(ii) connected to a common vapor supply line 14d from the sender 11d. The kettle cooking chamber 29d(i) and deep fat fryer conduit 29d(ii) of the closed loop circuit 25d have respective drains 15d(i), 15d(ii) communicating with a common condensation return line 15d through selectively operable valves 95, 96, which may be of a known packless, magnetically controlled type that can be operated while maintaining the sealed integrity of the closed loop circuit 25d. Thus, by appropriate operation of the valves 95, 96 it can be seen that the sender 11d may be utilized to circulate hot vapor through either or both of the cooking elements.

To maintain the vapor supply line 14d free of condensate when one or more of the cooking elements 12d(i), 12d(ii) are shut down by its respective valve 95, 96, a trap 100 is coupled to the vapor supply line 14d and return line 15d in parallel with the cooking elements.

The trap 100 includes a heat expandable bellows 101 disposed between a fixed support 102 and an outlet 104. When the valves 95, 96 are in their open position, the hot vapor circulating through the closed loop circuit will cause the bellows 101 to be heated and expanded to close the outlet 104 and interrupt the flow of vapor through the trap 100. Upon closing of either or both of the valves 95, 96 the respective heating elements 12d(i), 12d(ii) will tend to cool by reason of the termination of the flow of hot vapor therethrough, and such cooling will cause condensate to accumulate within the vapor chamber of the cooking element. When the condensate accumulates to the level of the vapor supply line 14d, the excess condensate will be carried through the supply line 14d to the trap 100. The flow of condensate into the trap will tend to cool the bellows 101, causing the bellows 101 to contract, opening the outlet 104 thereof, and permitting the condensate to flow into the condensate return line 15d for return to the sender 11d. When the valves 95, 96 later are opened, the bellows 101 again will be heated to close the trap outlet.

It will be appreciated that by separating the heat generating sender from the cooking elements in the foregoing manner, the sender may have a standardized, relatively simple design and may be manufactured in several sizes for handling most commercial cooking requirements. By separating the heat generating step of the cooking system from the step of transferring heat to the food, the design of the cooking element or receiver also can be simplified. The use of a single sender for a plurality of cooking elements, particularly when the sender is remotely located, further permits more compact kitchen design.

From the foregoing, it can be seen that the cooking system of the present invention is adapted for low cost manufacture and can be operated with relatively high energy utilization efficiencies and reduced exhaust and ventilating requirements in the kitchen, as compared to conventional cooking equipment. It has also been shown that the system is adapted to permit more efficient utilization of kitchen space, and can be operated without drawing combustion air or emitting combustion gases in the kitchen and without significantly increasing the temperature of the kitchen. By appropriate selection of the heat transfer fluid the system can have a wide temperature range of operation and is easily controlled and monitored.

I claim as my invention:
1. A cooking system comprising
   a cooking element for receiving food to be cooked;
   heat generating means,
   a sealed closed loop circuit within which a working fluid is circulated for transferring heat from said heat generating means to said cooking element and the food received therein;
   said closed loop circuit including a heating and vaporization zone within which said working fluid is heated and vaporized by said heat generating means and a condensation zone within which at least a portion of said vapor is condensed during transfer of heat to food in said cooking element,
   said heat generating means comprising a gaseous fuel fired radiant burner, said closed loop circuit having a plurality of working fluid transfer tubes disposed in close, substantially parallel, heat transfer relation to said radiant burner, means for directing controlled quantities of gaseous fuel uniformly through said burner for burning with a high intensity flame on a surface thereof, said heating and vaporization zone including a chamber, said working fluid transfer tubes communicating with said chamber for receiving a continuous supply of said working fluid and for directing vapor into said chamber, first conduit means communicating between said chamber and said condensation zone for directing vapor to said condensation zone, and second conduit means communicating between said condensation zone and said chamber for directing condensate from said condensation zone to said chamber.

2. The cooking system of claim 1 in which said working fluid is water.

3. The cooking system of claim 1 in which said working fluid is a fluid selected from a group consisting of water, aliphatic oil, paraffinic oil, mineral salt, and metal.

4. The cooking system of claim 1 in which said transfer tubes each has a generally U-shaped configuration comprising a pair of parallel legs coupled together at one end and disposed with one leg in closer parallel relation to said burner than the other leg for imparting a directional flow of said working fluid in said transfer tubes.

5. The cooking system of claim 4 in which said transfer tube legs each are coupled to and communicate with said chamber.

6. The cooking system of claim 5 in which said chamber includes a quantity of said working fluid in liquid phase, and one leg of each said transfer tube extends into said chamber with the ends thereof above the level of said liquid phase working fluid and the other leg of each said transfer tube extends into said chamber with the end thereof below the level of said liquid phase working fluid.

7. The cooking system of claim 1 in which said burner is an elongated porous tile slab.

8. The cooking system of claim 7 including housing means for supporting said burner, said fuel directing means being disposed at one end of said burner, and said housing having an air inlet at the other end of said slab for the entry of combustion air.

9. The cooking system of claim 8 in which said fuel directing means includes a venturi tube and a discharge nozzle for directing fuel through said venturi tube at a high velocity to facilitate mixing thereof with combustion air.

10. The cooking system of claim 9 in which said venturi tube is disposed within a gas and air mixing plenum encompassing an underside of said burner.

11. The cooking system of claim 10 including a gas distributing plenum disposed within said mixing plenum and receiving a discharge end of said venturi tube, said gas distributing plenum being formed with gas outlet apertures on opposed sides thereof adjacent the discharge end of said venturi tube.

12. The cooking system of claim 10 in which said burner, venturi tube, and plenum are disposed at an angle of about 10° to the horizontal with said air inlet being adjacent a raised end thereof.

13. The cooking system of claim 8 in which said transfer tubes and said burner are disposed at an acute angle to the horizontal, and said air inlet is disposed adjacent a raised end of said burner.

14. The cooking system of claim 8 in which said housing means defines relatively narrow air passages about the opposed sides of said burner through which a portion of the air drawn into said air inlet passes during energization of said burner.

15. The cooking system of claim 8 including means for monitoring the existence of a flame on said burner.

16. The cooking system of claim 1 in which said condensation zone includes a vapor receiving chamber disposed in close relation to said cooking element.

17. The cooking system of claim 16 in which said cooking element is a kettle having a container for receiving a food to be heated, and said condensation zone vapor receiving chamber is disposed in close relation about the outer periphery of said container.

18. The cooking system of claim 16 in which said cooking element is a deep fat fryer having a grease holding container and a food holding basket positionable in said container, and said condensation zone vapor receiving chamber is disposed in close relation about the outer perimeter of said grease holding container.

19. The cooking system of claim 18 in which said condensation zone vapor receiving chamber is in the form of a conduit that surrounds said container.

20. The cooking system of claim 16 in which said cooking element is a flat grill plate upon which food to be grilled is placed.

21. The apparatus of claim 20 in which said condensation zone vapor receiving chamber is in the form of a conduit disposed in a coplanar array in close relation adjacent the underside of said grill plate.

22. The cooking system of claim 1 in which said cooking element is a convection steaming apparatus having a convection oven within which food to be steamed is placed and a steam generating boiler, said boiler having a water boiling container, means for supplying water to said container, and said condensation zone is disposed about said container for heating water in said container to the boiling point.

23. The cooking system of claim 22 in which said water supply means supplies water in said container to a level such that during boiling thereof a relatively thin film of water rises upwardly on the sides of said container.

24. The cooking system of claim 23 including a water discharge line coupled to said container for effecting removal of said water film as it rises to a predetermined upper level in said container.

25. The cooking system of claim 1 including a plurality of cooking elements, and said closed loop circuit is operable for transferring cooking heat to each of said cooking elements.

26. The cooking system of claim 25 in which said closed loop circuit includes a separate condensation zone adjacent each of said cooking elements.

27. The cooking system of claim 26 in which said first conduit means communicates vapor from said chamber to each of said condensation zones and said second conduit means communicates condensate from each of said condensation zones to said chamber.

28. The cooking system of claim 27 including respective selectively operable valve means for controlling the flow of working fluid to each of said condensation zones.

29. A method of cooking food including heating and vaporizing a working fluid in a plurality of transfer tubes at a first location by energizing a gaseous fueled radiant burner disposed in parallel heat transfer relation to said transfer tubes, communicating heated and vaporized working fluid from said plurality of transfer tubes to a common chamber, transferring the heated and vaporized working fluid from said chamber to a condensation zone adjacent a food containing cooking element at a second location via a first path of travel in a closed loop circuit communicating between said chamber and said condensation zone, transferring heat to the cooking element from the heated and vaporized working fluid in said condensation zone and condensing at least a portion of the vaporized fluid while in said condensation zone, and returning said condensed working fluid in said condensation zone to said chamber via a second path of travel in said sealed closed loop circuit to enable reheating and vaporization of the condensed working fluid.

30. The method of claim 29 including transferring said vaporized working fluid from said chamber to a plurality of separate food containing cooking elements.

31. The method of claim 29 including heating said working fluid at said first location to a temperature of at least about 260° F.

32. The method of claim 29 including heating said working fluid at said first location to a temperature of at least about 600° F.

33. A cooking system comprising
a cooking element for receiving food to be cooked,
heat generating means,
a sealed closed loop circuit within which a working fluid is circulated for transferring heat from said heat generating means to said cooking element and the food received therein,
said closed loop circuit including a heating and vaporization zone having a vaporization chamber within which said working fluid is heated and vaporized by said heat generating means and a condensation zone within which at least a portion of said vapor is condensed during transfer of heat to food in said cooking element, first conduit means communicating vapor from said heating and vaporization zone to said condensation zone and second conduit means for communicating condensate from said condensation zone to said heating and vaporization zone,
said closed loop circuit having a plurality of working fluid transfer tubes disposed in close relation to said radiant burner, said transfer tubes each having a generally U-shaped configuration comprising a pair of parallel legs coupled together at one end and communicating with said vaporization chamber at their other ends, said transfer tubes being disposed with one leg in closer relation to said burner than the other leg for imparting a directional flow of said working fluid in said transfer tubes, and
a transfer tube having transverse heat absorbing fins connecting said second conduit means to said vaporization chamber, said finned transfer tube being in proximate relation to said heat generating means so that condensate passing through said finned transfer tube from said second conduit means is preheated prior to entering said vaporization chamber.

34. A method of cooking food in a cooking system having a food receiving cooking element, a closed loop working fluid transfer circuit including a condensation zone adjacent the cooking element and a heating and vaporization zone having a plurality of working fluid transfer tubes and a common chamber in communication with said transfer tubes, and a gaseous fuel fired radiant burner, comprising the steps of energizing said radiant burner to heat and vaporize working fluid in said transfer tubes, communicating heated and vaporized working fluid from said transfer tubes to said chamber, transferring heated and vaporized working fluid from said chamber through a first path of travel in said closed loop circuit to said condensation zone for heating said cooking element and condensing at least a portion of the heated and vaporized working fluid, and communicating condensed working fluid from said condensation zone through a second path of travel in said closed loop circuit to said chamber for reheating and vaporization.

* * * * *